March 22, 1955 C. L. METZLER ET AL 2,704,640
TAPE DISPENSING DEVICE
Filed June 16, 1951 3 Sheets-Sheet 1
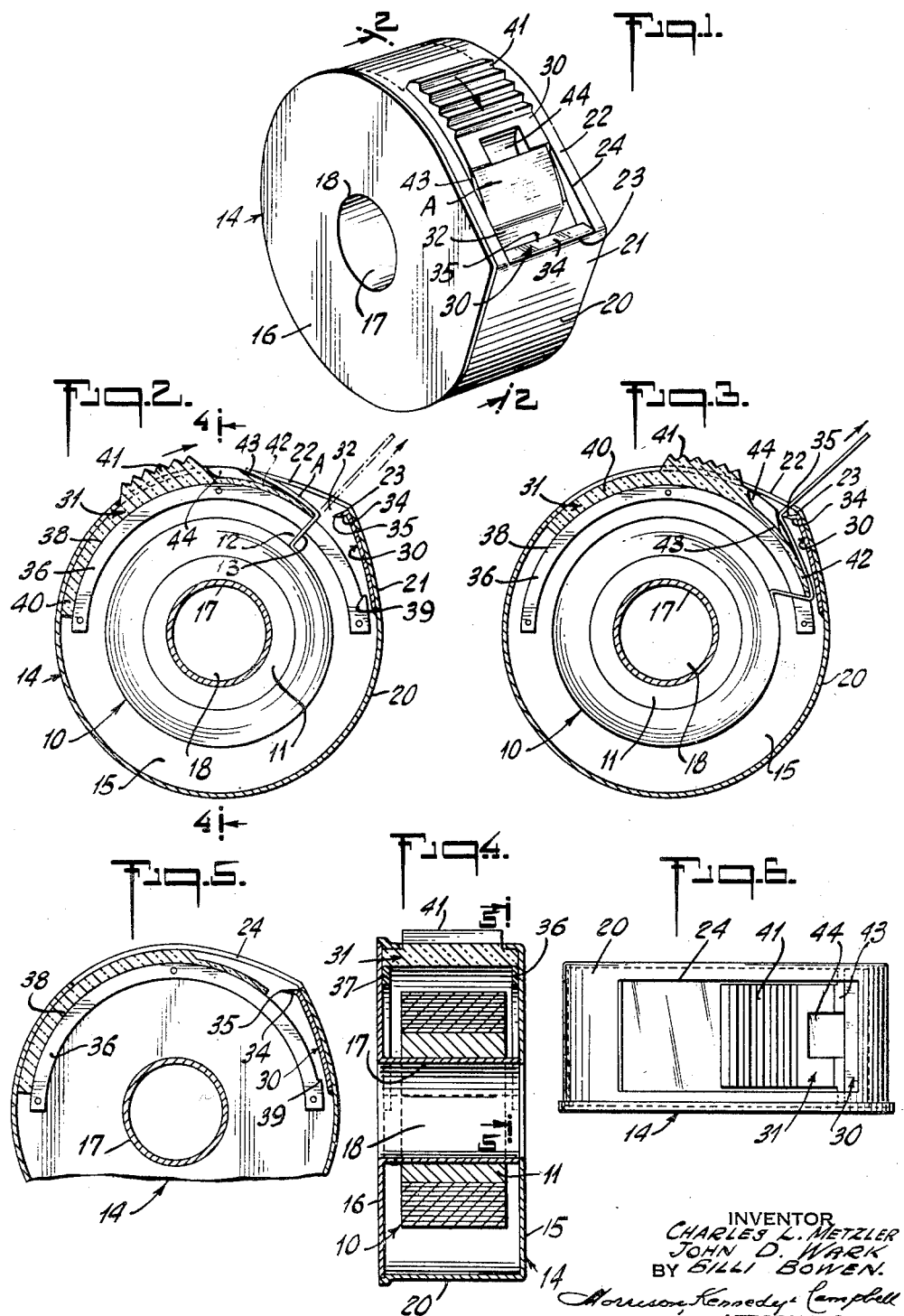
INVENTOR
CHARLES L. METZLER
JOHN D. WARK
BY BILL BOWEN.
Morrison, Kennedy & Campbell
ATTORNEYS

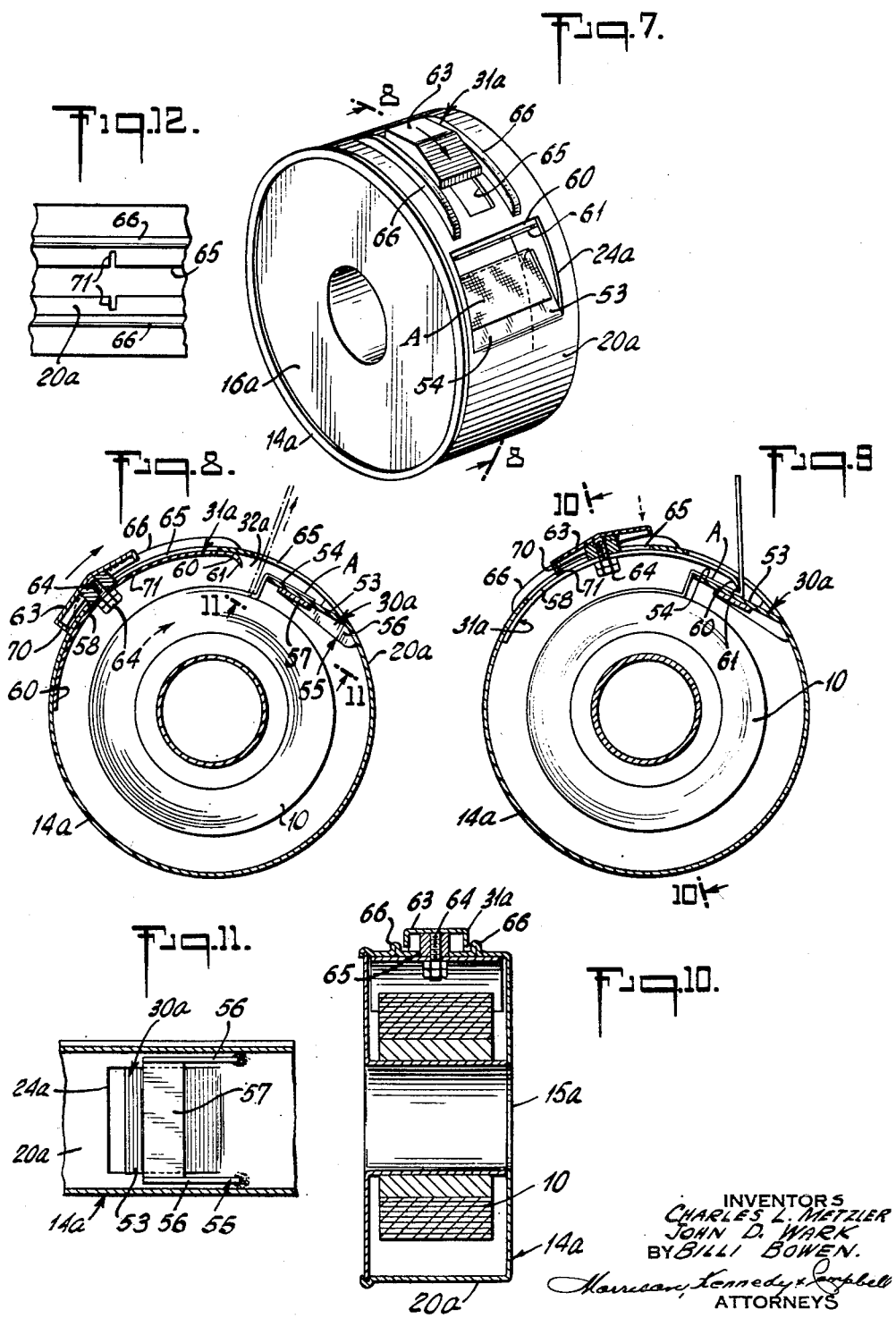

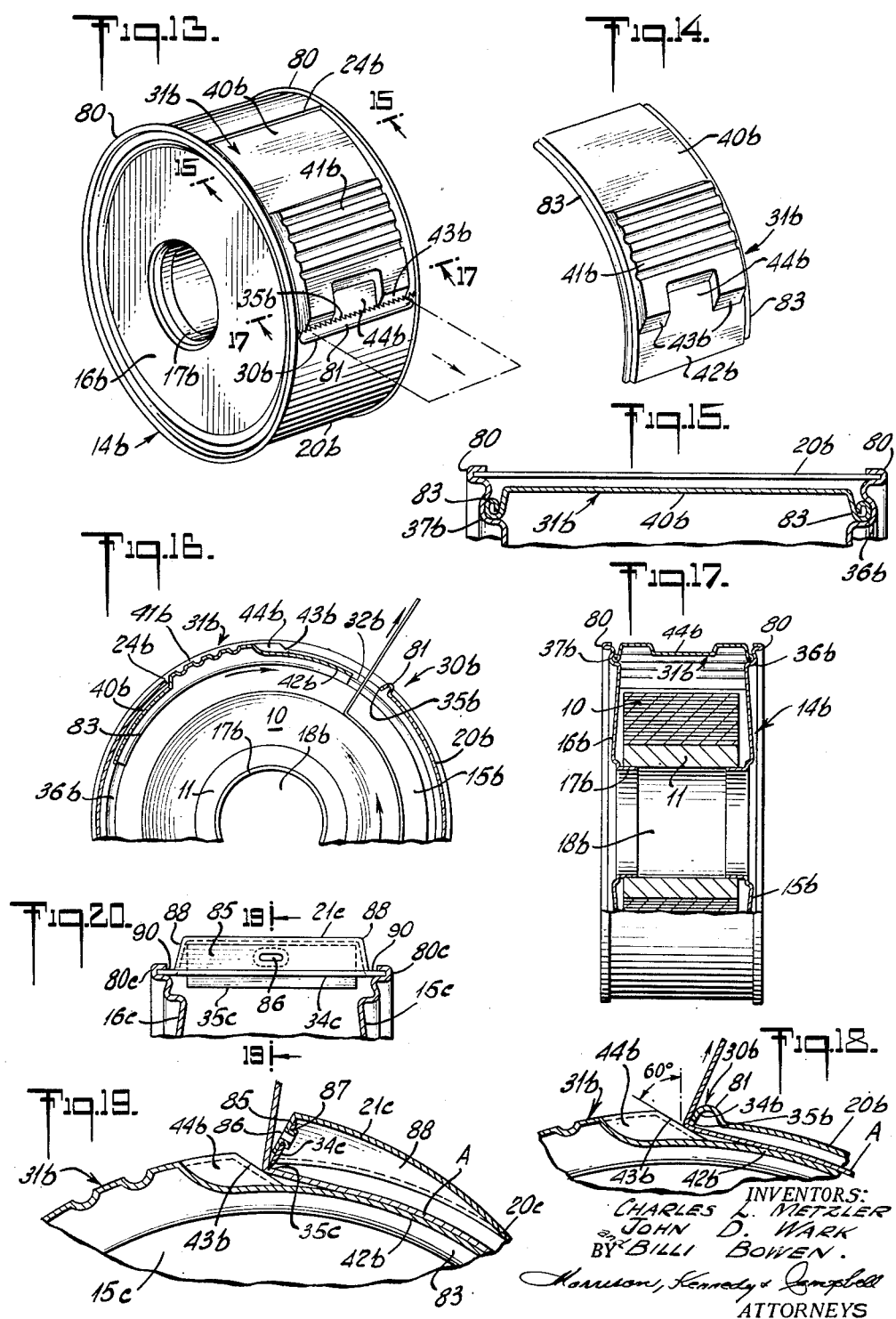

United States Patent Office 2,704,640
Patented Mar. 22, 1955

2,704,640

TAPE DISPENSING DEVICE

Charles L. Metzler, Palisades Park, N. J., John D. Wark, Freeport, N. Y., and Billi Bowen, Denver, Colo., assignors to Johnson & Johnson, New Brunswick, N. J., a corporation of New Jersey Application June 16, 1951, Serial No. 231,992

6 Claims. (Cl. 242—55.5)

The present application is a continuation in part of copending application Serial No. 179,694, filed August 16, 1950, now Patent No. 2,681,185. The invention herein relates to a tape dispensing device and although having a wide range of utility with respect to tapes in general, the device is particularly useful for dispensing adhesive plaster tape of the type used for dressing wounds, etc.

The ordinary adhesive plaster tape is difficult to handle for dispensing purposes because of the necessity of maintaining it clean and sanitary, and because of the adhesive thereon making the handling thereof messy. Moreover, the ordinary plaster tape of this type has a heavy cloth backing, making it comparatively strong and difficult to tear cleanly.

One object of the present invention is to provide a new and improved adhesive tape dispensing device, which is constructed to maintain the tape roll or pack effectively housed and protected against contamination, which is operable to dispense and sever tape sections of selected length, quickly, cleanly and with minimum of effort and with minimum of fingering of the tape or the tape pack, which is operable to dispense tape safely without the possibility of accidentally pinching or cutting the manipulating fingers or hand, and which is comparatively inexpensive to manufacture, so that when the tape roll or pack has been spent, it is economical to throw away the dispensing device.

Various other objects are apparent from the following particular description and from an inspection of the accompanying drawings, in which:

Fig. 1 is a perspective of one form of tape dispensing device embodying the present invention and shown in open position in preparation for a dispensing operation;

Fig. 2 is a section of the tape dispensing device taken on lines 2—2 of Fig. 1;

Fig. 3 is a section of the tape dispensing device similar to that of Fig. 2, but shown in closed position in preparation for the severance of the unreeled section of the tape;

Fig. 4 is a radial section of the tape dispensing device taken on lines 4—4 of Fig. 2;

Fig. 5 is a partial section of the tape dispensing device taken on lines 5—5 of Fig. 4;

Fig. 6 is a top plan view of the tape dispensing device shown in closed position corresponding to that shown in Fig. 3;

Fig. 7 is a perspective of another form of tape dispensing device embodying the present invention and shown in open position;

Fig. 8 is a section of the tape dispensing device taken on lines 8—8 of Fig. 7;

Fig. 9 is a section of the tape dispensing device similar to that of Fig. 8, but shown in closed position;

Fig. 10 is a section of the tape dispensing device taken on lines 10—10 of Fig. 9;

Fig. 11 is a detail section taken on lines 11—11 of Fig. 8;

Fig. 12 is a fragmentary top plan view of the housing for the tape dispensing device of Fig. 7;

Fig. 13 is a perspective of another form of tape dispensing device embodying the present invention and shown in closed tape severing position;

Fig. 14 is a perspective of the jaw slide forming part of the dispensing device of Fig. 13;

Fig. 15 is a radial section of the tape dispensing device taken along the lines 15—15 of Fig. 13 but shown on a larger scale;

Fig. 16 is a section of the tape dispensing device of Fig. 13 taken in a plane transverse to the axis of rotation of the spool and showing the device in open position while the tape is being paid out of the spool;

Fig. 17 is a radial section of the tape dispensing device taken along the lines 17—17 of Fig. 13;

Fig. 18 is a detail section of the tape dispensing device of Fig. 13 taken in a plane transverse to the axis of rotation of the spool and showing the device in closed tape severing position;

Fig. 19 is a detail section of another form of tape dispensing device taken in a plane transverse to the axis of rotation of the spool but on an enlarged scale and showing the device in closed tape severing position; and Fig. 20 is a detail section of the tape dispensing device of Fig. 19 in open position taken in a radial plane in front of the tape severing blade.

Referring to Figs. 1–6 of the drawings, the device of the present invention is shown in connection with a spool 10 of adhesive plaster tape wound around a core or hub 11 as a roll with the gum or adhesive side 12 of the tape facing radially inwardly and the fabric side 13 facing radially outwardly.

The tape dispensing device comprises a frame 14 supporting the spool 10 for free rotation. This frame 14 is desirably in the form of a housing having opposed end walls 15 and 16, the wall 16 having a central cylindrical flange 17 integral therewith as shown or otherwise secured thereto. This flange 17 extends axially inwardly of the housing 14 to the end housing wall 15 to form an axle for the spool 10 and to define a finger hole 18 by which the device may be conveniently held in an operator's hand for dispensing manipulation.

The end housing wall 15 has a peripheral flange 20 integral therewith as shown or otherwise secured thereto to define a peripheral housing wall and affixed to the other end housing wall 16, as by crimping, welding or soldering to form a rigid housing. The tape spool 10 is supported in this housing 14 with its hub 11 embracing the axle 17 for free rotation thereabout.

The end housing walls 15 and 16 are ovate orbicular in shape to provide the necessary space in the housing 14 for the tape holding mechanism to be described and the peripheral housing wall 20 is correspondingly shaped to define substantially flat tangential sections 21 and 22 tapering towards an apex 23. The peripheral wall section 21 is provided with a substantially rectangular dispensing opening 24 which extends to the wall apex 23 and through which the end unreeled section of the tape extends, as it is pulled off the spool 10.

Mounted near the opposite ends of the dispensing opening 24 of the housing 14 is a pair of opposed jaws or tape holding members 30 and 31 adapted to hold the paid out section of the tape against endwise movement, while it is being severed transversely and defining therebetween a discharge mouth 32 for the tape as it is being dispensed. One of these jaws 30 is affixed to the housing 14 and is shown in the general form of an angle piece secured to the underside of the peripheral housing wall section 22, as by soldering or welding and having a short flange 34 near the apex 23 of the peripheral housing wall 20 at the edge of the dispensing opening 24 extending substantially radially inwardly of the housing 14 to define a blade. This blade 34 terminates in a tapering edge 35 against which the paid section of the tape is held and along which it is ripped transversely by a tearing manipulation of the operator. This tear edge 35, which is protectively located within the general contour of the housing 14, need not be sharp and is effective for tape tearing purposes even if dull, because of the features to be described by which the tape is held against endwise movement, while it is being pulled against said jaw, and because the tape severing action is not a cutting action but a tearing action. However, since blade 34 is a member separate from the housing 14, it is preferably made of metal harder than that from which the housing is constructed. The blade 34 can therefore be provided with a sharp continuous edge 35, and this edge will effectively retain its keenness after repeated use.

The other jaw 31 in the form of a slide is supported on the housing 14 for movement along the dispensing opening 24 towards and away from the fixed jaw 30 to open and close the discharge mouth 32. This slidable jaw 31 is of generally arcuate shape and is guided and supported on a pair of opposed arcuate rails 36 and 37 secured to the inner faces of the end housing walls 15 and 16 respectively near their outer peripheries, as by welding, soldering or riveting and defining runways 38 concentric with the axle 17. A tail 40 on the slidable jaw 31 fits with a slide fit between the circular section of the peripheral housing wall 20 and the rails 36 and 37 and a raised part 41 of the jaw 31 extends through the dispensing opening 24 and is knurled to define a thumb piece. This thumb piece 41 in open position of the slidable jaw 31 engages one edge of the dispensing opening 24 as shown in Fig. 2 and serves thereby as a means for limiting the opening movement of the jaw 31. The closing movement of the slidable jaw 31 is limited by the fixed edge jaw 30, as will be made apparent. Limiting shoulders 39 on the rails 36 and 37 for the forward edge of the jaw 31 may be provided as a positive stop to assure against the jamming of said jaw in tape holding position by excessive thumb pressure.

The head end 42 of the slidable jaw 31 is guided and supported on the rails 36 and 37 and serves as a table to receive the tape in a manner to be described. A ramp or wedge surface 43 on this table 42 cooperates with the tear edge 35 of the fixed jaw 30 in holding the unreeled section of the tape against endwise movement during tape ripping action.

In tape clamping position of the slidable jaw 31, the forward or table section 42 of said jaw 31 extends past the tape tearing edge 35 of the fixed jaw 30, so that a section A of the tape inwardly of its line of severance lies on said table section as shown in Fig. 3. This tape section A adheres to the table 42 after the paid out section of the tape has been severed and after the jaw 31 has been slid back into open position shown in Fig. 2 and serves as an easily accessible tab by which the end of the tape may be lifted into the dot and dash line position shown in Fig. 2 in preparation for the next tape dispensing operation. To assist in lifting the tab section A of the tape from the table 42, said surface has a depression 44. In tape clamping position of the slidable jaw 31 shown in Fig. 3, the tearing edge 35 of the fixed jaw 30 extends across this depression 44, so that the end portion of the tab section A of the tape after severance extends over said depression.

As far as the broader aspects of the invention are concerned, the slidable jaw 31 may be made of any suitable material. In the form shown in Figs. 1–6, this jaw 31 is made in one molded piece of plastic and is desirably transparent, so that the tail end 40 of said jaw, in closed position of said jaw shown in Figs. 3 and 6 may serve as a window by which the state of fullness of the spool 10 may be observed.

In the operation of the dispensing device, this device is palmed in one hand with the middle finger of said hand extending into the hollow of the axle 17 and the thumb on said hand engaging the thumb piece 41 of the slidable jaw 31. This jaw 31 is slid back into open position shown in Fig. 3 by the thumb of one hand and the end section A of the tape is lifted from the table 42 by the other hand into the substantially radial position shown in dot and dash lines in Fig. 2. In this lifted positon of the end section A of the tape, this tape is pulled lengthwise through the jaw mouth 32, until the desired length of tape to be dispensed has been paid out. During this operation, the tape is peeled off and unreeled from the spool 10, and this spool is consequently rotated. When the required amount of tape has been pulled out, the jaw 31 through manipulation of the thumb is moved towards the fixed jaw 30, until the tape is clamped between the tear edge 35 and the ramp surface 43 of the two jaws as shown in Fig. 3. The clamping action of the jaws 30 and 31 on the tape assisted by the adhesive grip of the tape on table 42 of the slidable jaw 31 and by the sharp folding of the tape around the forward edge of said jaw 31 and around the tearing edge 35 holds the tape firmly against endwise movement, while it is being ripped along said edge. This tape ripping action is effected by the simple operation of pulling the tape along the tearing edge 35.

In view of the depression 44 in the slidable jaw 31, this jaw only presses the sides of the tape against the tear edge 35. However, this tape clamping action is at the region where it is most desirable, since the side of the tape which is initially ripped bears the greatest pull and has the greatest tendency to stretch during tape severing action. The clamping at the side of the tape where the tear is to be initiated assures a clean initial tear. The rest of the tape will be cleanly ripped transversely along the tear edge 35, even though the tape is not pressed against said edge by the slidable jaw 31 in the area over the depression 44.

It is seen that the dispensing device not only holds the tape spool 10 sanitarily protected in the housing 14 against contamination, but also permits dispensation of the tape with the minimum of fingering of the section of the tape being dispensed and without fingering the spool itself. Also, the jaws 30 and 31 protectively operate inside the housing 14, so that the possibility of accidentally pinching or cutting the fingers of the operator therebetween is avoided.

It should be noted that the wedge or ramp surface 43 of the slidable jaw 31 permits the pressure of said jaw on the tape severing jaw edge 35 to be regulated easily by thumb pressure on the slidable jaw and confines the clamping pressure on the tape to a narrow transverse strip area, so that no damage is suffered by the end section of the tape by rubbing or jamming, except along the strip area where it is to be severed.

In the form of the invention shown in Figs. 7–12, the dispensing device comprises a housing 14a similar to the housing 14 in the construction of Figs. 1–6, except that the end walls 15a and 16a and the peripheral wall 20a of said housing 14a are entirely circular. This peripheral wall 20a has a dispensing opening 24a through which the end unreeled section of the tape extends as it is pulled off the spool 10.

Mounted on the housing 14a is a pair of opposed jaws or tape holding members 30a and 31a adapted to hold the paid out section of the tape against endwise movement while it is being severed transversely and defining therebetween a discharge mouth 32a for the tape as it is being dispensed.

One of the jaws 30a is affixed to the housing 14a and comprises a table 53 in the form of a tongue cut out of the peripheral housing wall 20a to define the dispensing opening 24a and extending therefrom inwardly of the housing 14a at an acute angle with respect to the tangent of said wall at the supported or base end of said tongue, to define an inclined wedge surface 54 for cooperation with the jaw 31a. This table 53 is firmly supported against hinge movement about its base by means of a bracket 55 comprising side arms 56 welded, soldered or otherwise fastened to the inner face of the peripheral housing wall 20a and a cross-piece 57 secured to and spanning said arms and serving as a seat for said tongue 53.

The other jaw 31a in the form of a slide is edged for tape clamping cooperation with the fixed jaw 30a and is supported for movement towards and away from said fixed jaw 30a to open and close the discharge mouth 32a. This slidable jaw 31a comprises a spring plate 58 in the general form of an angle piece having a section 60 flexed by the peripheral housing wall 20a into conforming engagement with the inner face of said housing wall 20a and a short flange 60 at one end extending inwardly of the housing 14a to define a blade. This blade 60 terminates in a tapering tear edge 61 against which the tape is held as it is ripped transversely by a tearing manipulation of the operator.

For guiding and supporting the slidable jaw 31a, said jaw carries a thumb piece 63 seated on the outer surface of the peripheral housing wall 20a and secured to the plate 58 by fastening means 64 extending through an elongated circumferential guide slot 65 in said housing wall and engaging the end of said slot in limiting open position of said jaw 31a shown in Fig. 8. This thumb piece 63 is shown of double slope construction, to facilitate rocking manipulation thereof, for the purpose to be described, and is retained for slide movement along the peripheral housing wall 20a snugly between two circumferential guide flanges 66 formed, as for example by the crimping or folding of the wall material.

The slidable jaw 31a has releasable means for automatically locking it against withdrawal when in tape tearing position. This locking means comprises a tail 70 on the rear end of the thumb piece 63 bearing against the peripheral housing wall 20a and thereby tilting the thumb piece clockwise (Fig. 8) against the action of the spring plate 58. This tail 70 is adapted to snap into a cross-slot 71 in the peripheral housing wall 20a when the slidable jaw 31a reaches tape tearing position shown in Fig. 9. This locks the slidable jaw 31a against withdrawal, so that the tearing of the tape along the tear edge 61 can be effected without the necessity of applying finger resisting pressure to the thumb piece 63. For releasing the slidable jaw 31a, the thumb piece 63 is rocked clockwise (Fig. 9) by application of downward pressure of the forward sloping side of said thumb piece against the action of the spring plate 58. This raises the tail 70 on the thumb piece 63 out of the cross-slot 71 and permits the slidable jaw 31a to be withdrawn to the inactive position shown in Fig. 8. The locking device described thereby acts as a spring latch.

In operation, the jaw 31a is moved towards the jaw 30a in a general direction substantially lengthwise of the table surface 54 of the jaw 30a. Consequently, as the two jaws 30a and 31a come together, the tape tear edge 61 of the jaw 31a rides over the table surface 54 of the jaw 30a until the tape is held between said jaws. In this position the slidable jaw 31a will be locked as described.

While the tape is clamped in position shown in Fig. 9 for severance, the end section A of the tape inwardly of the line of severance lies on the table surface 54 of the fixed jaw 30a. This tape section A adheres to this table surface 54 after the paid out section of the tape has been severed and after the jaw 31a has been slid back into open position shown in Fig. 8 and serves as a tab by which the end of the tape may be lifted into the dot and dash line position shown in preparation for unreeling operations. The spool 10 is mounted in the housing 14a in position reversed from that of the spool in the construction of Figs. 1–6, so that the tape as it is being pulled out substantially radially from the tape roll has its adhesive side facing the fixed table jaw 30a, as shown in dot and dash lines in Fig. 8.

In the operation of the dispensing device shown in Figs. 7–12, while the device is held in one hand in the manner described in connection with the construction of Figs. 1–6 and the jaw 31a is held back into open limiting position shown in Fig. 8 by the thumb of said hand, the tape is pulled out by the other hand through the discharge mouth 32a. When a desired length of tape has been pulled out, the jaw 31a is slid towards the fixed jaw 30a. During this operation, the edge 61 of the slidable jaw 31a engages the taut tape and folds it over the table surface 54 of the fixed jaw 30a, until the tape is firmly held in position shown in Fig. 9. A tearing manipulation of the tape along the edge 61 of the jaw 31a, rips the tape along this edge, while the end section A of the tape left in the housing 14a remains on the table surface 54 of the fixed jaw 30a in easily accessible position to be lifted for the next dispensing operation.

In the form of the invention shown in Figs. 1–6, the jaws 30 and 31 have been described as clamping the tape therebetween in closed position of the slidable jaw 31. Similarly in the form shown in Figs. 7–12, the jaws 30a and 31a have been described as performing a similar clamping operation on the tape. Such tape clamping action is desirable, but as far as certain aspects of the invention are concerned, the opposed jaws need only hold the tape therebetween against lengthwise movement during severing action, and the adhesive attachment of the tape to the table, and the friction hold of the tape resulting from its sharp turns around the edges of the jaws may be sufficient for the purpose, especially where the tape is not so strong and therefore is comparatively easy to tear. Under these conditions, the opposed jaws need come only close enough together to assure the laying of the tape over the table surface.

Figs. 13–18 show still another form of tape dispenser of the general type illustrated in Figs. 1–6. This modified form however is constructed less expensively from stamped metal parts and for that purpose comprises a frame 14b made of two similar opposed circular end wall sections 15b and 16b and a peripheral wall section 20b rigidly secured thereto in a manner to be described to define therewith a substantially cylindrical housing for the tape spool 10. Each end wall section 15b and 16b has integral therewith a short central cylindrical flange 17b extending axially inwardly to form an axle support for the core or hub 11 of the tape spool 10 and to define a finger hole 18b by which the device may be conveniently held in an operator's hand for dispensing manipulation. The peripheral wall section 20b has a substantially rectangular tape dispensing opening 24b through which the end unreeled section of the tape extends as it is pulled off the spool 10, as shown in Fig. 16.

For securing the housing sections 15b, 16b and 20b together into a rigid unit, each of the end wall sections 15b and 16b is circumferentially bent around its outer edge to provide a groove 80 with opposed sides pressed tightly over and against the corresponding edge of the peripheral wall section 20b to form a strong friction connection between said end wall sections and said peripheral section.

On the housing 14b is a pair of opposed jaws or tape holding members 30b and 31b adapted to hold the paid out section of the tape against endwise movement, while it is being severed transversely and defining therebetween a discharge mouth 32b for the tape as it is being dispensed. The jaw 30b is rigid with the housing 14b and is made by bending in the shape of a gooseneck one end of the peripheral wall section 20b of said housing to form a reinforcing rib 81 terminating in a narrow substantially radially inwardly turned lip or blade 34b having a tear edge 35b against which the paid section of the tape is held and along which said tape is ripped transversely by a tearing manipulation of the operator. The tear edge 35b extends protectively within the general contour of the housing 14b and is serrated to facilitate tearing therealong. It is desirable to provide a serrated tear edge instead of a sharp edge because the blade 34b is made of stampable metal and therefore cannot retain a sharp straight edge against repeated use.

The other jaw 31b in the form of a slide is stamped from a single flat metal blank and is supported on the housing 14b for movement along the dispensing opening 24b towards and away from the fixed jaw 30b to open and close the discharge mouth 32b. This slidable jaw 31b is of generally arcuate shape and is supported on a pair of arcuate rails 36b and 37b located on the inner faces of the end housing wall sections 15b and 16b respectively and concentrically arranged with respect to the axis center of the housing. These rails 36b and 37b are formed on the end housing wall sections 15b and 16b respectively by stamping and to that end are in the form of channels of concavely curved cross-section. The side edges of the slide 31b are rolled to form arcuate runners 83 extending in the rail channels 36b and 37b respectively with conforming slide fits.

The slide 31b is stamped as described from a flat metal blank sheet to form an arcuate tail 40b and a raised intermediate portion 41b, corrugated to define a knurled thumb piece and extending through the dispensing opening 24b to the outside of the housing 14b in accessible position to permit easy manipulation of the slide along the peripheral wall section 20b. This thumb piece 41b in open position of the slide 31b engages one edge of the dispensing opening 24b as shown in Fig. 16 and serves thereby as a means for limiting the opening movement of said slide. The closing movement of the slide 31b is limited by the engagement of said slide with the tear edge 35b, as will be more fully described.

The slide 31b is also formed by stamping with an arcuate head 42b serving as a table to receive the tape and having along a section thereof a ramp or wedge surface 43b cooperating with the tear edge 35b in holding the unreeled section of the tape against endwise movement during tape ripping action and extending at an angle of about 60° with a radial plane, as shown in Fig. 18.

In tape clamping position of the slide 31b, the forward part of the table 42b thereon extends past the tape tearing edge 35b of said slide, so that the section A of the tape inwardly of its line of severance lies on said forward table part as shown in Figs. 13 and 18 and serves as a tab accessible for easy lifting from said table in preparation for the next tape dispensing operation, when said slide is moved back into open position. To assist in lifting the tab section A of the tape from the slide table 42b, the slide 31b is formed by bending with a depression 44b along the part of said table where the ramp or wedge surface 43b is located. In tape clamping position of the slide 31b shown in Fig. 13, the tear edge 35b extends across the depression 44b, so that the end portion of the tape section A after severance extends over the forward part of said depression.

In the process of assembling, the housing wall sections 15b, 16b and 20b and the slide 31b preformed by stamping from respective flat metal blanks into the shape described are set up in proper relationship and the circular edges of the end housing wall sections 15b and 16c are folded and crimped over the side edges of the peripheral housing section 20b to bind the housing wall sections together into a rigid housing and to hold the slide 31b in operable position in said housing.

The operation of the tape dispensing device of Figs. 13–18 is similar to that described in connection with Figs. 1–7.

Figs. 19 and 20 show another form of tape dispensing device similar to those shown in Figs. 1–7 and Figs. 13–18. In this modified form, blade 34c separate from the peripheral wall section of the housing but rigidly secured thereto is provided. This blade 34c is of harder metal than the bendable metal of the housing and therefore can be provided with a sharp continuous tear edge 35c which will retain its keen edge under repeated use.

The blade 34c is wider than the blade 34b formed by bending of the end of the peripheral wall section 20b in the construction of Figs. 13–18. To permit the use of such a wider blade 34c in the construction of Figs. 19 and 20, the end housing wall sections 15c and 16c are circular and similar in shape to the end housing wall sections 15b and 16b in the construction of Figs. 13–18, but the peripheral wall section 20c is cylindrical for its entire circumference except for a raised substantially tangential portion 21c terminating in a substantially radially inwardly turned flange 85. The blade 34c is secured to the inside of this flange 85 by puncturing an elongated hole 86 through said flange, so that the flange metal from this hole is upset through a corresponding hole 87 in the blade and forms thereby a rivet connection between the flange and the blade.

The raised portion 21c is preferably formed in the peripheral housing wall section 20c by stamping from a flat metal blank, this raised portion being dished by this stamping operation to define not only the flange 85 of sufficient width to support the blade 34c in operative position but substantially triangular side walls 88 rising outwardly from the end housing wall sections 15c and 16c to impart structural rigidity to this raised peripheral wall portion. The base of this raised peripheral wall portion 21c has circular flanges 90 extending outwardly sideways from its triangular side walls 88 and forming continuations of the marginal sides of the cylindrical or circular portion of the peripheral housing wall section 20c for frictional retention in the assembling grooves 80c of the end housing wall sections 15c and 16c.

Except as indicated, the construction of Figs. 19 and 20 is the same as that of Figs. 13–18.

While the invention has been described with particular reference to specific embodiments, it is to be understood that it is not to be limited thereto, but is to be construed broadly and restricted solely by the scope of the appended claims.

What is claimed is:

1. A portable dispensing device for an adhesive tape roll, comprising a housing for the roll having separate end walls and an outer peripheral wall secured thereto and provided with a discharge opening for the section of the tape to be dispensed, a jaw affixed to said housing near one end of said opening, a second jaw, said end walls being stamped to provide rail channels in the inner faces of said end walls respectively, the sides of said second jaw having runners extending into said channels respectively with slide fits, whereby said second jaw is supported within said housing for slide movement along said opening towards and away from the fixed jaw and into and out of tape holding position, one of said jaws having a blade extending inwardly towards the interior of said housing and terminating at its inner side within the general outline of said peripheral wall in an edge along which the tape is adapted to be severed in tape holding position of said jaws.

2. A portable dispensing device for an adhesive tape roll as defined in claim 1, characterized in that the second jaw is stamped from a flat metal blank, and the sides thereof are rolled to form the runners.

3. A portable dispensing device for a roll of adhesive tape, comprising a housing having separate opposed end walls and an outer peripheral wall secured along its sides to the peripheries of said end walls to form a rigid unit, the peripheral wall having a tape dispensing opening, said end walls being stamped from flat metal blanks to provide on each of said walls an axially inwardly extending cylindrical flange serving as an axle support for the tape roll and a substantially circular rail channel on its inner face substantially concentric with the axis of said flange, a blade rigid with the peripheral wall at one end of said opening and having a tape severing edge extending transversely of the path of the tape passing through said opening, and a tape holding member inside said housing having arcuate runners on its sides extending into said channels respectively with slide fits, whereby said tape holding member is supported for slide movement along said opening away from said blade and towards said blade into tape holding position with respect thereto.

4. A portable dispensing device for a roll of adhesive tape, comprising a housing having opposed end walls and an outer peripheral wall with a tape dispensing opening, means for supporting the tape roll in said housing for rotation about an axis extending between said end walls, a blade rigid with said peripheral wall at one end of said opening and presenting a tape severing edge extending transversely of the path of the tape passing through said opening, rails on the inner faces of said end walls respectively, and a tape holding member stamped from a flat metal blank to form thereon (1) side runners seated on said rails respectively, whereby said tape holding member is supported for slide movement along said opening away from said blade and towards said blade into tape holding position with respect thereto, (2) a table surface with a wedge section on which the tape is adapted to be laid and across which said tape severing edge is adapted to pressingly extend in tape holding position of the tape holding member, (3) a depression in the area of said wedge section, and (4) a finger piece section for slide manipulation of said tape holding member.

5. A portable dispensing device for a roll of adhesive tape, comprising a housing having opposed end walls and an outer peripheral wall with a tape dispensing opening, said peripheral wall being substantially cylindrical for a major part of its circumference with a substantially tangential section extending towards one end of said opening and constituting a raised portion having substantially triangular side walls, formed by stamping said peripheral wall, and said end walls being circular and being secured at their outer peripheries to the sides of said peripheral wall including the base sections of said triangular side walls, a blade separate from said peripheral wall and fixed to the end of said tangential section at one end of said opening, said blade being directed inwardly towards the interior of said housing to define a tape severing edge within the general outline of the peripheral wall, and a tape holding member mounted on said housing for slide movement along said peripheral wall and along said opening towards and away from said tape severing edge and presenting a tape clamping surface on the inner side of said edge to hold the tape against said edge and to hold thereby said tape against lengthwise movement, while said tape is being manually torn along said edge.

6. A portable dispensing device for a roll of adhesive tape, as defined in claim 5, wherein the raised tangential section is formed with an end wall interconnecting the triangular side walls thereof and wherein the blade is connected to the latter end wall.

References Cited in the file of this patent

UNITED STATES PATENTS

| | | |
|---|---|---|
| 1,212,020 | Contant, Jr. | Jan. 9, 1917 |
| 1,515,238 | Baker | Nov. 11, 1924 |
| 1,729,432 | Anderson | Sept. 24, 1929 |
| 2,447,519 | Marinsky | Aug. 24, 1948 |
| 2,547,569 | Erhardt | Apr. 3, 1951 |